March 27, 1928.
J. A. THERASSE
MIRROR BRACKET
Filed Aug. 11, 1925
1,663,672
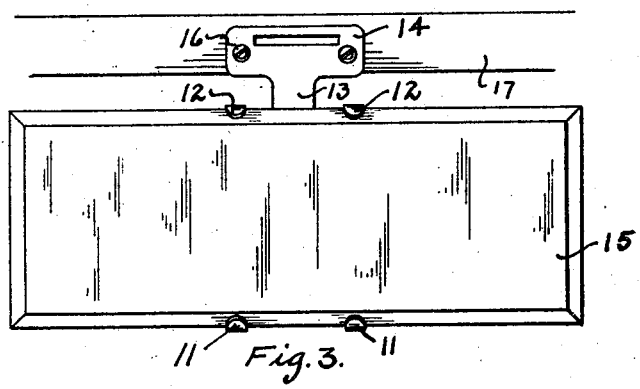
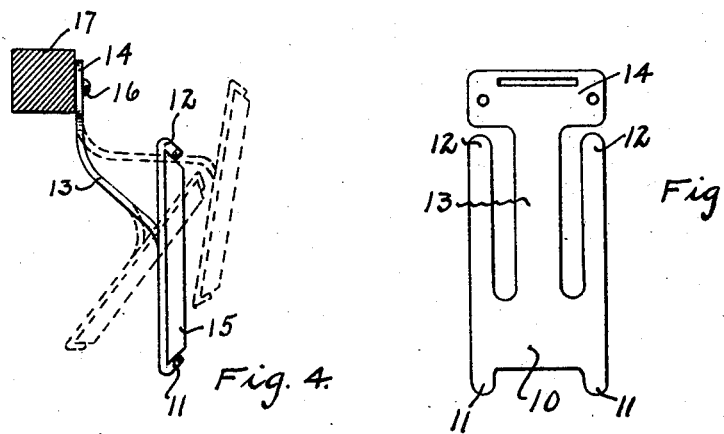
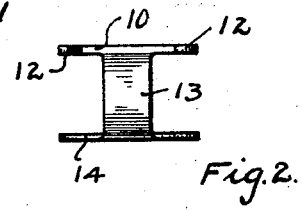
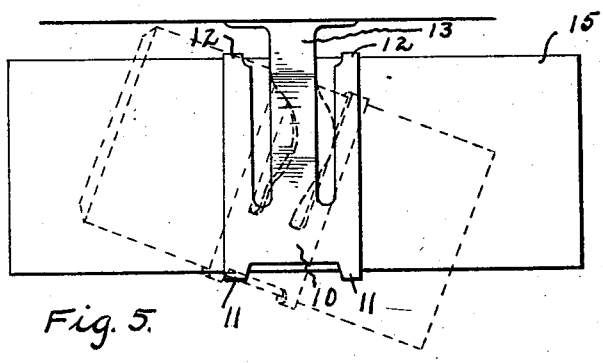
INVENTOR,
Jules A. Therasse,
By Minturn & Minturn,
Attorneys.

Patented Mar. 27, 1928.

1,663,672

UNITED STATES PATENT OFFICE.

JULES A. THERASSE, OF MARION, INDIANA, ASSIGNOR TO IRVINGTON AUTO PRODUCTS CORPORATION, OF INDIANAPOLIS, INDIANA, A CORPORATION OF INDIANA.

MIRROR BRACKET.

Application filed August 11, 1925. Serial No. 49,670.

My invention relates to a bracket such as may be employed for holding rear-vision mirrors in an automobile.

A rear-vision mirror for an automobile is practically a necessity and is, in many States, a statutory requirement, but considerable difficulty has always been experienced in procuring a bracket to hold the mirror that was universally adjustable to obtain the exact angle of the mirror required to secure the proper reflection from the roadway to the rear, and once having obtained that angle, such brackets as heretofore obtainable would not hold that adjustment under road shocks or were equipped with one or more screw-threaded means of tightening up the bracket, which means required two hands of the operator, and then would not stay tight. Furthermore, with varying loads, as in a truck, the angle of the mirror is changed such that frequent adjustment is necessary to obtain a clear rear view, without the driver having to turn his head unduly.

It is the object of my invention to overcome such difficulties as above indicated by providing an integral one-piece bracket to hold the mirror by soft gripping fingers and to be attached by bolts or screws by a tongue member, rigidly to the automobile frame-work, and it is the further object to permit adjusting the mirror by merely turning it to the position wanted whereupon the mirror remains in that position rigidly and securely until again changed, all without any ball joints, ratchets, thumb-screws, or the like. Other objects reside in the ease and extreme low cost of production, permitting the bracket to be offered the public at a price far under other types of brackets now sold.

I accomplish these and such other objects as may become apparent in the following description by the means as illustrated in the accompanying drawing, in which—

Fig. 1 is a front elevation of my bracket as stamped out and before forming; Fig. 2, a bottom view of the bracket with the tongue member bent to its normal position; Fig. 3, a front elevation of a rear-vision mirror being held by my bracket; Fig. 4, a side elevation of my bracket holding a mirror, and showing by dotted lines various positions the mirror may take; and Fig. 5, a rear elevation of my bracket holding a mirror, and showing by dotted lines, an angular position in which the mirror may be held.

Like characters of reference indicate like parts throughout the various views.

A critical feature of my invention lies in the particular metal from which the bracket is formed. I have found that a soft aluminum such as is employed for deep spinning and of thickness as may be required for varying sizes of mirrors, is best adapted for the bracket, such material being not only rust proof, but easily bent innumerable times without danger of fracture and at the same time possessing sufficient rigidity to hold any desired bend put in it without undue vibration under recurring external shocks.

From such material, I cut a form such as is shown in Fig. 1, having a body portion 10, with the two short depending fingers 11, the two longer upwardly projecting fingers 12, and the central tongue member 13 which terminates in the attaching head 14.

The tongue 13 is bent backwardly away from the head and thence upwardly to bring the head 14 parallel to the body 10 as in Figs. 2 and 4. The mirror 15, having its edges best bevelled, is laid across the body 10 and the ends of the fingers 11 and 12 are pressed around firmly over the mirror top and bottom edges to grip the mirror 15 snugly and securely, as shown in Figs. 3, 4 and 5.

The mirror 15 is then ready for use and is suspended by placing bolts or screws 16 through the head 14 around or into some part of the automobile frame-work such as the usual top rail 17 or windshield frame.

Rarely ever can the mirror be left in a straight position, but must be set at an angle to reflect properly, and such a position, or positions, may be secured immediately by merely twisting or turning the mirror as needed, as is best indicated in Figs. 4 and 5, and particularly in Fig. 5, where it is shown that the mirror may be turned to any angle in any plane, giving the desired universal adjustment with the attendant extreme ease and simplicity.

Having described my invention in the form now best known to me, I desire to point out that obviously many structural changes may be made without departing from the spirit of my invention, and I, therefore, do not desire to be limited to the precise structure as shown, nor any more than may be required by the following claims.

I claim:

1. A new article of manufacture comprising a bracket stamped from bendable and twistable metal, having a central body, depending fingers, upwardly extending fingers, an upwardly extending tongue and a head on the tongue, said bracket being formed by bending the tongue away from the head, and the ends of the fingers being adapted to be bent around to grip an object therebetween and against the body.

2. A new article of manufacture comprising a bracket stamped from metal, having a central body, depending fingers, upwardly extending fingers, an upwardly extending tongue and a head on the tongue, said bracket being formed by bending the tongue away from the head, and the ends of the fingers being adapted to be bent around to grip an object therebetween and against the body, said metal being of rigid and nonelastic nature but easily bent and twisted.

3. A one piece mirror bracket formed of bendable and twistable metal, the said bracket having fingers to grip the mirror, an extending tongue, and a mounting head on the tongue.

4. A one piece mirror bracket formed of bendable and twistable metal, the said bracket having a tongue, means on said tongue for holding a mirror, and means on said tongue for anchoring the same to a supporting surface.

In testimony whereof I affix my signature.

JULES A. THERASSE.